April 15, 1930.       N. BENFORD       1,754,593
AUTOMOBILE WHEEL
Filed Sept. 15, 1928       2 Sheets-Sheet 1

Inventor
N. Benford

By Clarence A. O'Brien
Attorney

April 15, 1930.                N. BENFORD                1,754,593
                              AUTOMOBILE WHEEL
                    Filed Sept. 15, 1928        2 Sheets-Sheet 2

Inventor
N. Benford
By Clarence A. O'Brien
                Attorney

Patented Apr. 15, 1930

1,754,593

UNITED STATES PATENT OFFICE

NAT BENFORD, OF CLEVELAND, OHIO

AUTOMOBILE WHEEL

Application filed September 15, 1928. Serial No. 306,231.

The present invention relates to improvements in vehicle wheels and has for its principal object to provide a wheel with a metallic tread that will be as resilient in carrying a load and absorbing the shock as the ordinary pneumatic tired automobile wheel.

Still a further object is to provide an automobile wheel which will permit the use of solid tires with equally as good results as obtained with the usual pneumatic tire.

Still a further object is to provide an automobile wheel wherein the ground engaging shoes that enclose the tire will absolutely protect the tire against punctures and bruises occasioned by stones and other obstacles lying on the roadway over which the automobile wheel travels.

Still a further object is to provide an automobile wheel that includes means for urging the sectional shoes outwardly in a radial direction.

A further object is to provide an automobile wheel of the above mentioned character which is simple in construction, inexpensive, strong and durable and further well adapted to the purposes for which it is designed.

Other objects and advantages will become apparent during the course of the following description.

In the accompanying drawing, forming a part of this specification, and in which like numerals indicate like parts throughout the same;

Figure 2:
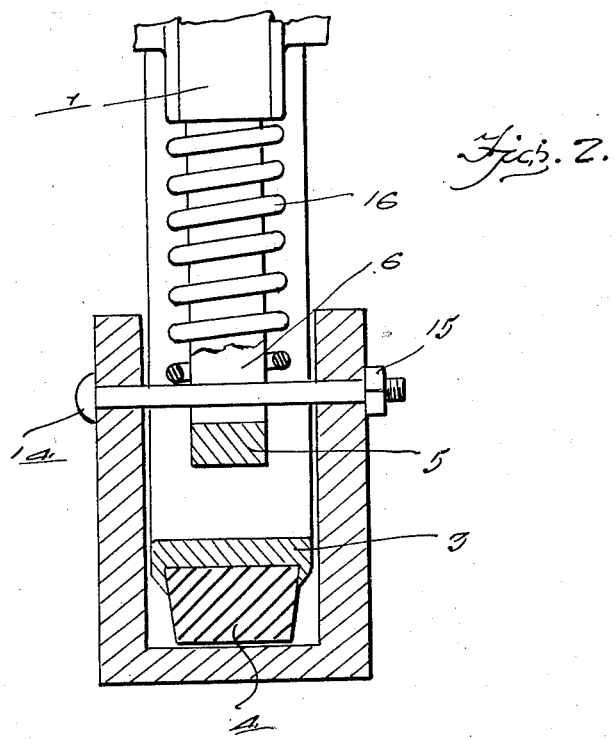
Figure 2 is a sectional view taken approximately on the line 2—2 of Figure 1.

In the drawings wherein for the purpose of illustration is shown a preferred embodiment of my invention, the numeral 1 designates the hub of the wheel and extending radially therefrom are the spokes 2 that support at their outer ends the rim 3 on which rim is mounted the solid rubber tire 4 in the manner as shown in Figure 2.

Figure 1:
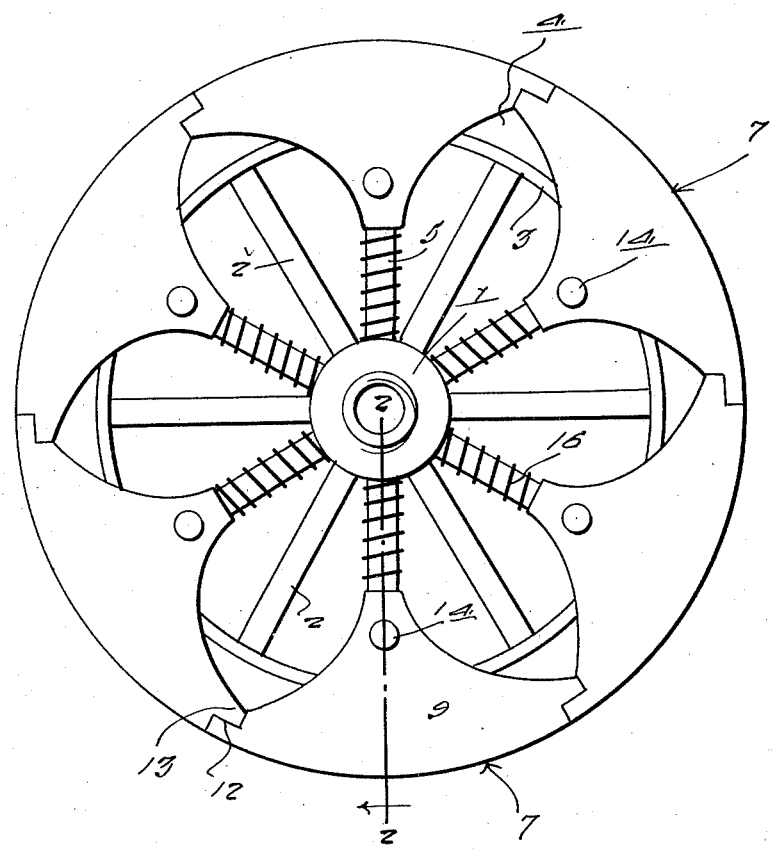
Figure 1 is a side elevation of my improved automobile wheel.
Figure 4:
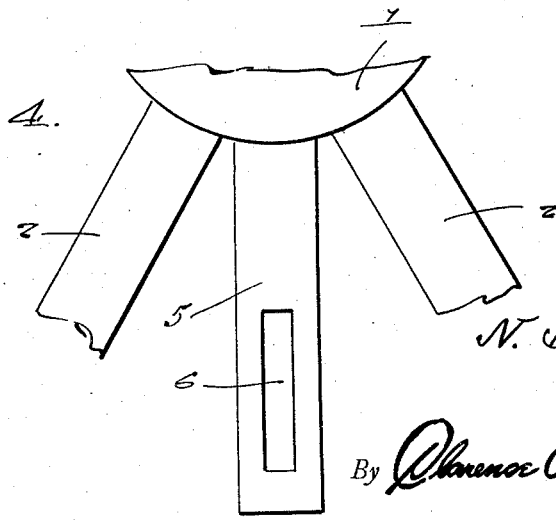
Figure 3 is a detail perspective view of one of the shoes forming a part of the present invention and Figure 4 is a fragmentary detail view showing one of the slotted stems that extends radially from the hub of the wheel.

A series of radially disposed stems 5 are associated with the hub 1, the stems being interposed between the adjacent spokes in the manner as shown very clearly in Figures 1 and 4. The outer end of each stem terminates inwardly of the rim or felly 3 and as is clearly shown in Figure 4, the outer end portion of each stem is formed with the longitudinally extending slot 6, the purpose of which will be presently described.

Figure 3:
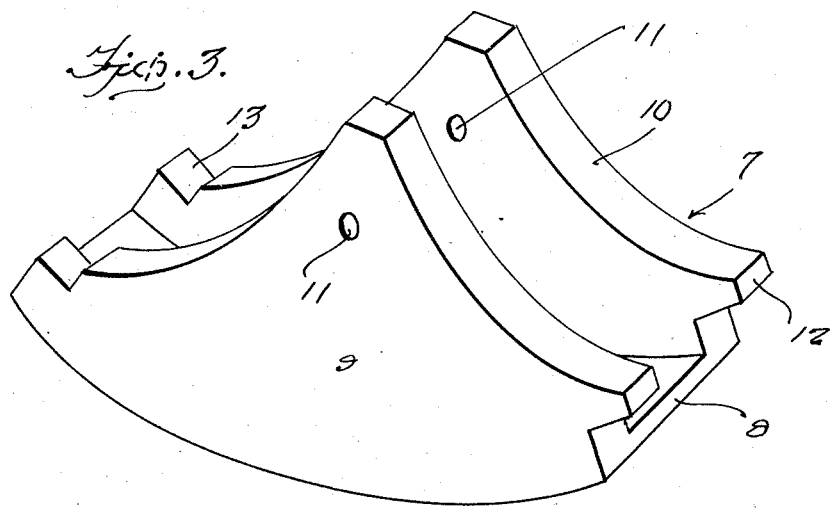

The invention further comprehends the provision of a series of tire encircling shoes 7. Each shoe includes the arcuate shaped ground engaging plate 8 and extending inwardly from the side edges of the plate 8 are the flanges 9 and 10 respectively, said flanges being of substantial triangular shape in elevation, the sides of each flange being slightly curved and as is clearly shown in Figure 3. The inner ends or apex portions of the parallel spaced flanges are formed with registering openings 11, for a purpose to be presently described.

The flanges 9 and 10 are formed at one end with the laterally projecting tongues 12 for cooperation with notches 13 formed in the adjacent ends of the next adjacent flanges whereupon when said shoes are disposed circumferentially around the tire 4, the ends of the arcuate shaped plates 8 will be disposed in abutting relation to form a sectional surface engaging band.

The flanges 9 and 10 extend inwardly on opposite sides of the tire and its supporting rim or felly and furthermore the apex portions of the flanges are disposed on opposite sides of the respective slotted stems.

A bolt 14 extends through the registering openings 11 and through the slot 6, the head of the bolt engaging the outer face of the outermost flange while a nut 15 is threaded on the threaded end of the bolt for engagement with the outer face of the innermost flange in the manner as shown very clearly in Figure 2.

The bolt is operable in the slot 6 to permit radial movement of the sectional shoe and an expansible coil spring 16 encircles each stem for disposition between the hub 1 and the bolt 14 for normally urging the shoes outwardly.

A wheel of the above mentioned character will obviate the necessity of having to employ a pneumatic tire and an inflatable inner tube and also the shoes 7 protect the tire as is readily obvious from the construction disclosed. The simplicity of my improved construction enables the parts to be readily and easily assembled and disassembled and furthermore the wheel will at all times be positive and efficient in its operation.

While I have shown the preferred embodiment of my invention, it is to be understood that various changes in the size, shape and arrangement of parts may be resorted to without departing from the spirit of the invention and the scope of the appended claim.

Having thus described my invention, what I claim as new is:

An automobile wheel including a hub having a series of spokes extending radially therefrom and a tire supporting rim mounted on the other ends of the spokes and a tire mounted on the rim a series of stems extending radially from the hub between the adjacent spokes and in longitudinal alignment therewith, the outer ends of the stems terminating inwardly of the rim and each being formed with a longitudinal slot, a series of tire and rim encircling shoes, each shoe including an arcuate shaped plate for circumferential disposition upon the tread portion of the tire, outwardly of each stem, inwardly extending flanges formed at the side edges of the plates terminating adjacent the opposite sides of the stems at the free end portions thereof, a bolt extending through the inner ends of the flanges and slidable through the slot of the adjacent slotted stem, and an expansible coil spring encircling each slotted stem for disposition between the hub and the bolt for normally urging each shoe outwardly.

In testimony whereof I affix my signature.

NAT BENFORD.